US010882273B2

(12) United States Patent
Beck, Jr. et al.

(10) Patent No.: US 10,882,273 B2
(45) Date of Patent: Jan. 5, 2021

(54) EXTRUDED NIB DESIGN FOR AUTOMOTIVE FLOOR MATS

(71) Applicant: International Automotive Components Group North America, Inc., Southfield, MI (US)

(72) Inventors: Gabriel B. Beck, Jr., North Canton, OH (US); Ernest Franklin Wilson, Albemarle, NC (US); Sean Bracken Simmons, Concord, NC (US)

(73) Assignee: AURIA SOLUTIONS UK I LTD., London (GB)

( * ) Notice: Subject to any disclaimer, the term of this patent is extended or adjusted under 35 U.S.C. 154(b) by 309 days.

(21) Appl. No.: 15/398,136

(22) Filed: Jan. 4, 2017

(65) Prior Publication Data

US 2017/0190140 A1    Jul. 6, 2017

Related U.S. Application Data

(60) Provisional application No. 62/275,090, filed on Jan. 5, 2016.

(51) Int. Cl.
*B32B 3/26* (2006.01)
*B32B 38/06* (2006.01)
(Continued)

(52) U.S. Cl.
CPC .................. *B32B 3/26* (2013.01); *B32B 3/02* (2013.01); *B32B 3/263* (2013.01); *B32B 3/30* (2013.01);
(Continued)

(58) Field of Classification Search
CPC .......... B60N 3/04; B60N 3/044; B60N 3/046; B60N 3/048; B32B 3/02; B32B 3/26;
(Continued)

(56) References Cited

U.S. PATENT DOCUMENTS 4,886,692 A * 12/1989 Kerr .................... A47G 27/0412
428/82
5,154,961 A * 10/1992 Reuben ................ A43B 3/0078
15/215

(Continued)

FOREIGN PATENT DOCUMENTS

JP    2000135736 A * 5/2000
JP    2009040235 A    2/2009

OTHER PUBLICATIONS

ASTM International; Designatin: D1894-11; "Standard Test Method for Static and Kinetic Coefficients of Frictin of Plastic Film and Sheeting"; Sep. 23, 2011 (7 pgs).
(Continued)

*Primary Examiner* — Cheryl Juska
(74) *Attorney, Agent, or Firm* — Steven J. Grossman; Grossman Tucker Perreault & Pfleger (57) ABSTRACT

A floor mat and a method of forming thereof, wherein the floor mat includes a backing layer embossed to provide a plurality of nibs extending from a surface of the backing layer while the backing layer remains molten. Each of the nibs is tiered, including a frusto-conical base and a tip extending from the frusto-conical base, the nibs having a maximum diameter in the range of 0.5 to 3.0 mm and an overall height in the range of 1.5 mm to 5 mm. In addition, each nib is located within a column and a row and is offset from at least one other nib present in the column and at least one other nib present in the row.

10 Claims, 6 Drawing Sheets

(51) Int. Cl.
| | |
|---|---|
| *B60N 3/04* | (2006.01) |
| *B32B 5/02* | (2006.01) |
| *B32B 27/32* | (2006.01) |
| *B32B 27/30* | (2006.01) |
| *B32B 25/10* | (2006.01) |
| *B32B 7/12* | (2006.01) |
| *B32B 27/12* | (2006.01) |
| *B32B 27/40* | (2006.01) |
| *B32B 25/16* | (2006.01) |
| *B32B 3/30* | (2006.01) |
| *B32B 25/14* | (2006.01) |
| *B32B 7/04* | (2019.01) |
| *B32B 3/02* | (2006.01) |
| *D06N 7/00* | (2006.01) |
| *A47G 27/02* | (2006.01) |

(52) U.S. Cl.
CPC .............. *B32B 5/022* (2013.01); *B32B 5/024* (2013.01); *B32B 7/04* (2013.01); *B32B 7/12* (2013.01); *B32B 25/10* (2013.01); *B32B 25/14* (2013.01); *B32B 25/16* (2013.01); *B32B 27/12* (2013.01); *B32B 27/302* (2013.01); *B32B 27/32* (2013.01); *B32B 27/40* (2013.01); *B32B 38/06* (2013.01); *B60N 3/04* (2013.01); *B60N 3/042* (2013.01); *B60N 3/044* (2013.01); *B60N 3/046* (2013.01); *B60N 3/048* (2013.01); *D06N 7/0071* (2013.01); *A47G 27/0281* (2013.01); *B32B 2250/02* (2013.01); *B32B 2262/0253* (2013.01); *B32B 2262/0261* (2013.01); *B32B 2262/0284* (2013.01); *B32B 2262/04* (2013.01); *B32B 2262/062* (2013.01); *B32B 2262/08* (2013.01); *B32B 2262/14* (2013.01); *B32B 2274/00* (2013.01); *B32B 2307/50* (2013.01); *B32B 2307/54* (2013.01); *B32B 2307/72* (2013.01); *B32B 2307/732* (2013.01); *B32B 2307/744* (2013.01); *B32B 2471/04* (2013.01); *D06N 2209/106* (2013.01); *Y10T 428/23929* (2015.04); *Y10T 428/23979* (2015.04)

(58) Field of Classification Search
CPC ........... B32B 3/263; B32B 3/30; B32B 38/06; A47G 27/0281; D06N 7/0071; D06N 2209/106; Y10T 428/23929; Y10T 428/23979
See application file for complete search history.

(56) References Cited

U.S. PATENT DOCUMENTS

| | | | | |
|---|---|---|---|---|
| 5,362,544 | A * | 11/1994 | Reuben | A43B 3/0078 15/215 |
| 5,620,546 | A * | 4/1997 | Reuben | A43B 3/0078 156/219 |
| 6,022,503 | A | 2/2000 | Hudkins et al. | |
| RE36,677 | E * | 5/2000 | Reuben | A43B 3/0078 156/219 |
| 6,238,765 | B1 * | 5/2001 | Bailey | B60N 3/046 24/442 |
| 6,296,733 | B1 | 10/2001 | Hudkins et al. | |
| 6,382,350 | B1 * | 5/2002 | Jezewski | B32B 3/266 181/290 |
| 6,420,015 | B1 * | 7/2002 | Nord | A47G 27/0231 264/293 |
| 6,589,631 | B1 * | 7/2003 | Suzuki | A47G 27/0231 15/215 |
| 6,599,615 | B2 * | 7/2003 | Burke, III | A47G 27/0231 428/120 |
| 6,709,728 | B2 * | 3/2004 | Kerr | A47L 23/266 428/47 |
| 6,787,215 | B1 * | 9/2004 | Burke, III | A47L 23/266 428/159 |
| 6,921,502 | B1 * | 7/2005 | Nord | A47L 23/24 264/257 |
| 6,953,545 | B1 * | 10/2005 | Tyler | B29C 51/02 264/554 |
| 7,182,994 | B1 | 2/2007 | Scott | |
| D589,290 | S * | 3/2009 | Hatta | D6/587 |
| 2001/0000233 | A1 * | 4/2001 | Bailey | B60N 3/046 428/99 |
| 2001/0046582 | A1 * | 11/2001 | Kerr | A47L 23/266 428/95 |
| 2003/0091782 | A1 * | 5/2003 | Burke, III | A47G 27/0231 428/81 |
| 2004/0009329 | A1 * | 1/2004 | Whitaker | B60N 3/046 428/141 |
| 2004/0048035 | A1 * | 3/2004 | Bailey | A47L 23/266 428/95 |
| 2004/0148725 | A1 * | 8/2004 | Blum | A47L 23/22 15/215 |
| 2006/0099387 | A1 | 5/2006 | Parkes et al. | |
| 2007/0163701 | A1 * | 7/2007 | Kanno | B29C 43/222 156/209 |
| 2009/0230717 | A1 * | 9/2009 | MacNeil | B32B 3/28 296/97.23 |
| 2011/0009994 | A1 * | 1/2011 | MacNeil | B60N 3/044 700/98 |
| 2011/0039051 | A1 * | 2/2011 | Flowers, Jr. | B32B 3/30 428/78 |
| 2012/0321877 | A1 * | 12/2012 | Whitesell | D06N 7/0081 428/221 |
| 2013/0084427 | A1 * | 4/2013 | Ernst | B32B 27/065 428/141 |
| 2014/0322490 | A1 * | 10/2014 | Vreys | A47G 27/0206 428/156 |
| 2016/0327113 | A1 * | 11/2016 | Shelley | A41D 13/0158 |
| 2017/0013987 | A1 * | 1/2017 | Tillery | A47L 23/266 |

OTHER PUBLICATIONS

Weather Tech <<http://mobilliving.com/product/weathertech-all-weather-floor-mats/>> (accessed Dec. 14, 2015).

* cited by examiner

EXTRUDED NIB DESIGN FOR AUTOMOTIVE FLOOR MATS

CROSS-REFERENCE TO RELATED APPLICATIONS

This application claims the benefit of U.S. Provisional Application No. 62/275,090, filed Jan. 5, 2016.

FIELD

The present disclosure is directed to a nib design for automotive floor mats deployed over non-woven or tufted carpet systems.

BACKGROUND

Automotive floor mats are used to supplement and protect the carpet lining the floor of the passenger cabin in an automobile. However, the floor mats have a tendency to slip on the carpet lining. To prevent or reduce slippage, automotive floor mats commonly include nibs extending from the back of the floor mat. The nibs, also referred to as nubs, or bristles, include cone shaped projections that are designed to extend into the underlying carpet and secure the floor mat in place. In attempts to reduce cost and weight, underlying carpet design has shifted from tufted to non-woven systems. However, current nib patterns do not work well for both non-woven and tufted carpet systems.

Nibs are commonly molded onto the back of the floor mats prior to finishing the edges of the mat. To finish the mat edges, an edge pattern is sewn on the mat. It is often necessary to remove any nibs present at the perimeter of the mat prior to sewing the edge pattern onto the mat as the nibs get caught between the pressure foot and feed dogs of the sewing machines. In addition, it is often necessary to remove any nibs present in locations where printing or inscribing on the mat is performed to provide product identification marks.

Accordingly, room remains for improvement in the design of floor mat nibs. It is desirable to provide nibs that further reduce the problem of slippage of the floor mats relative to underlying carpet systems regardless of whether the system is a non-woven or a tufted carpet system. It is also desirable to provide nibs that allow for secondary steps, such as sewing and marking, to be performed without first having to remove the nibs from selected surfaces of the mats. By not having to remove nibs prior to performing such secondary steps, manufacturing costs may be lowered and drag performance of the mats may be improved.

SUMMARY

An aspect of the present disclosure relates to a floor mat. The floor mat includes a backing layer having a surface and a plurality of nibs extending from the surface. The nibs are tiered, including a frusto-conical base extending from the surface of the backing layer and a tip extending from the frusto-conical base. The nibs also have a maximum diameter in the range of 0.5 to 3.0 mm and an overall height in the range of 1.5 mm to 5 mm. Each nib is located within a column and a row and is offset from at least one other nib present in the column and at least one other nib present in the row. In embodiments, the plurality of nibs form an array of nibs and the array is repeated on the backing layer. In preferred embodiments, an array includes 4 columns of nibs and 6 rows of nibs. Preferably, the nibs are present at a density of 2,000 to 150,000 nibs per square meter. Also preferably, the backing layer is formed from a thermoplastic elastomer having an ash content in the range of 20 to 40% by weight, a melt flow index in the range of 60 grams per 10 minutes to 150 grams per 10 minutes measured at 190° C. and 21.6 kg, a tensile strength in the range of 3,000 kPa to 5,000 kPa, an elongation in the range of 450% to 700%, and a density in the range of 1.0 g/cm$^3$ to 1.33 g/cm$^3$.

In embodiments, the floor mat further includes a cover layer. The cover layer is positioned at a second surface of the backing layer opposing the surface of the backing layer including the nibs. In particular embodiments, an adhesive is disposed between the cover layer and the backing layer. The cover layer is preferably tufted, woven, or non-woven.

In any of the above embodiments, the floor mat includes marking on the surface from which the nibs extend. Further, in any of the above embodiments an edge of the floor mat includes a roll pattern, a binding, or both a roll pattern and a binding. Preferably, nibs remain present underneath the roll pattern, the binding, or both the roll pattern and the binding. In preferred embodiments, the floor mat exhibits a static coefficient of friction of greater than 2.0 on a non-woven or tufted testing surface, in both the warp and fill directions of the testing surface, when tested according to ASTM D1894-11.

Another aspect of the present disclosure relates to a method of forming the floor mat described above including an array of nibs. The method includes forming a backing layer and embossing the backing layer while the backing layer is at least partially molten to provide a plurality of nibs extending from a surface of the backing layer. Each of the nibs is tiered, including a frusto-conical base extending from the surface of the backing layer and a tip extending from the frusto-conical base. The nibs each have a maximum diameter in the range of 0.5 to 3.0 mm and an overall height in the range of 1.5 mm to 5 mm. In addition, each nib is located within a column and a row and is offset from at least one other nib present in the column and at least one other nib present in the row. In embodiments, the array of nibs is repeated on the backing layer. In preferred embodiments, the array includes 4 columns of nibs and 6 rows of nibs.

In embodiments of the above, the method further includes affixing the backing layer to a cover layer. The cover layer is positioned at a second surface opposing the surface including the plurality of nibs. In addition, the backing layer is preferably affixed to the cover layer by extruding the backing layer on the cover layer. The cover layer is preferably tufted, woven, or non-woven.

In any of the above embodiments, the method further includes performing a secondary operation. The secondary operation includes one or both of (1) marking the surface from which the nibs extend and (2) finishing an edge of the backing layer. Preferably, the secondary operation is performed without removing the nibs prior to performing the secondary operation. Preferably, finishing the edge includes sewing, such as sewing a roll pattern, a binding, or both a roll pattern and a binding onto the floor mat.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein:

FIG. 1b is an embodiment of nib dimensions for the nib of FIG. 1a;

FIG. 2b provides a breakdown of the randomized array pattern of FIG. 2a;

DETAILED DESCRIPTION

The present disclosure is directed to an extruded nib design for automotive floor mats that improves drag performance, minimizing movement in the fore-, aft-, and cross-car directions of the vehicle. The extruded nib design also provides a common design that may be deployed over a number of OEM floor carpet systems including non-woven and tufted carpet systems. In addition, the present design accommodates weight and cost reduction by requiring relatively less material, and eliminates the need to remove nibs prior to performing secondary steps such as edge finishing and product marking.

Figure 1A:
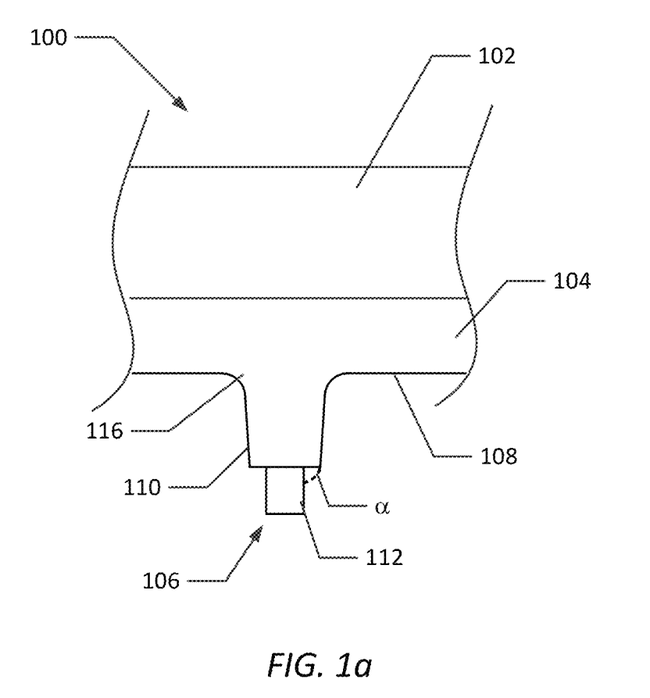
FIG. 1a is an embodiment of a nib according to the present disclosure.

FIG. 1a illustrates an embodiment of a portion of a floor mat. The floor mat 100 generally includes a cover layer 102, a backing layer 104 and a plurality of nibs extending from the backing layer 106. The cover layer 102 is preferably formed from, for example, a woven, non-woven or tufted carpet. The carpet fibers preferably include thermoplastic fibers such as nylon 6, nylon 6, 6, polypropylene, polyethylene terephthalate, and polylactic acid or co-polymers of any of the aforementioned thermoplastic fibers, as well as organic fibers such as cotton, rayon, and wool, or combinations of any of the above.

In preferred embodiments, the backing layer 104 is extruded onto the cover layer 102 and nibs 106 are formed on the backing layer utilizing a pattern roll, i.e., an inline embossing roll. The pattern roll applies pressure on at least partially molten backing material, forcing the material into cavities 120 in the roll surface 122, illustrated in FIG. 2a, that shape the nibs. The roll pressure may also join the backing layer 104 to the cover layer 102 with or without the aid of an adhesive disposed between the backing layer 104 and cover layer 102. It may be appreciated that the backing layer 104 and nibs 106 may be formed by other melt forming processes such as thermoforming or compression molding. In alternative embodiments, the cover layer 102 is eliminated altogether.

The backing layer 104 is preferably formed from a thermoplastic material or a thermoset material, such as low density polyethylene having a density in the range of 0.91 -0.94 g/cm$^3$, high density polyethylene having a density of greater than 0.94 g/cm$^3$, polypropylene, or a thermoplastic elastomer such as styrene block copolymers, thermoplastic olefins, or thermoplastic polyurethanes as well as rubber such as urethane, styrene butadiene block copolymer, polyisoprene, polysiloxane, ethylene propylene diene rubber or SANTOPRENE™ thermoplastic vulcanite. In one particularly preferred embodiment, the backing layer is a thermoplastic elastomer having the following general characteristics: Ash Content: 20% to 40% (wt); Melt Flow Index at 190° C. and 21.6 kg=60 grams per 10 minutes to 150 grams per 10 minutes; Tensile Strength=3000 kPa to 5000 kPa; Elongation=450% to 700% and Density=1.0 g/cm$^3$ to 1.33 g/cm$^3$.

In embodiments, where the backing layer 104 is extruded and formed onto the cover layer 102, it is preferable that the material selected for the backing layer 104 has a lower melting point than the material selected for the cover layer 102, and preferably at least 10° C. lower than the cover layer material, preventing the cover layer 102 from melting during formation of the backing layer 104. In other embodiments, the backing layer 104 exhibits a higher melting point than the material selected for the cover layer. In embodiments where the backing layer 104 is a thermoset material, the material may not exhibit a melting temperature. The backing layer 104, including the nib design, exhibits a basis weight in the range of 20 ounces per square yard to 144 ounces per square yard and more preferably in the range of 20 ounces per square yard to 40 ounces per square yard, such as 30 ounces per square yard.

The nibs 106 may generally be tiered including a frusto-conical base 110 extending from the surface 108 of the backing layer 104 and a tip 112 extending from the frusto-conical base. The frusto-conical base 110 and tip 112 may individually be hollow or solid. In addition, the frusto-conical base 110 preferably meets the surface 108 of the backing layer 104 in a radius 116 around the perimeter of the base 110 as illustrated. However, the frusto-conical base 110 may alternatively meet the surface 108 of the backing layer 104 with a relatively sharp corner. The tip 112 is preferably cylindrical and is illustrated as such; however, the tip may assume cross-sectional geometries other than circular, such as square, rectangular, ellipsoid, etc. Further, the distal portion of the tip (i.e., the portion distal from the base) may be flat, as illustrated, rounded or pointed. As illustrated, and preferred, the sidewall of the tip 112 meets upper surface of the frusto-conical base at an angle α of 90 degrees; however, angle α may be selected from an angle in the range of 45 to 135, including all values and ranges therein.

Figure 1B:
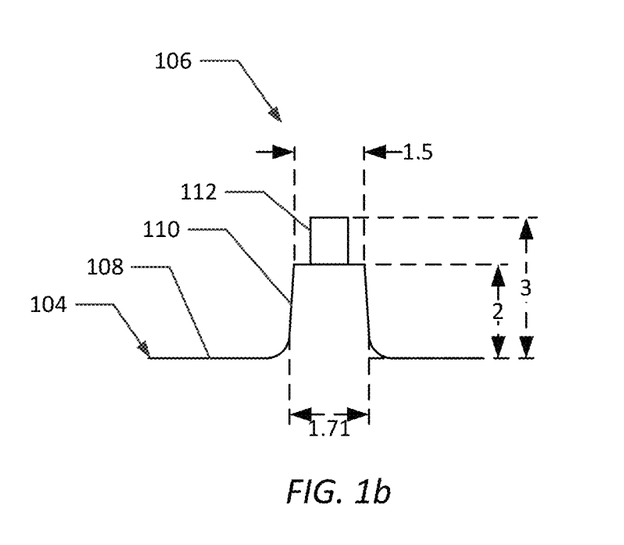

The maximum diameter of the nibs 106 is preferably in the range of 0.5 to 3.0 mm, including all values and ranges therein, and the overall height of the nibs is preferably range of 1.5 mm to 5 mm, including all values and ranges therein. The height of the tip 112 is preferably in the range 10 percent to 50 percent of the total height of the nibs 106 and more preferably in the range of 25 percent to 35 percent of the total height of the nibs 106. FIG. 1b illustrates an example of nib dimensions. In this example, the bottom of the frusto-conical base 110 is 1.71 mm in diameter and the top of the frusto-conical base is 1.5 mm in diameter. Further, the frusto-conical base 110 extends 2 mm in height from the surface 108 of the backing layer 104 and the entire nib extends 3 mm in height from the surface 108 of the backing layer 104. The thickness of the backing layer 104 is preferably in the range of 0.5 mm to 6.0 mm including all values and ranges therein.

The nib design includes a plurality of nibs that form a randomized pattern array, which array is preferably repeated. The randomized pattern of the plurality of nibs is described with reference to a machine direction (generally the direction of extrusion) and transverse direction (90 degrees to the machine direction) for purposes of convenience. However, it may be appreciated that in applications where the backing layer 104 is not extruded, the machine direction may simply be reference to a "Y" direction and the transverse direction may simply be reference to an "X" direction, wherein the pattern may be rotated at any angle from 0 to 180 degrees, including all values and ranges therein, such as 45 to 135 degrees or 90 degrees. Preferably, the density of the nibs is in the range of 2,000 nibs per square meter to 150,000 nibs per square meter, including all values and ranges therein, and more preferably 12,000 nibs per square meter.

Figure 2A:
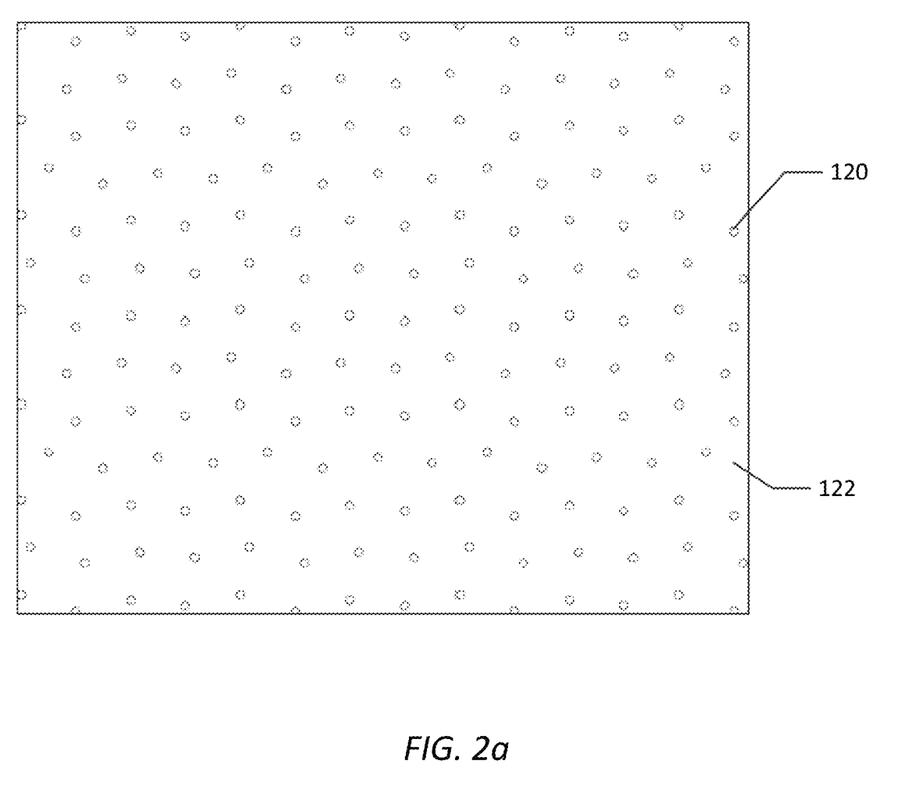
FIG. 2a is an embodiment of a 4×6 randomized array nib pattern roll.
Figure 2B:
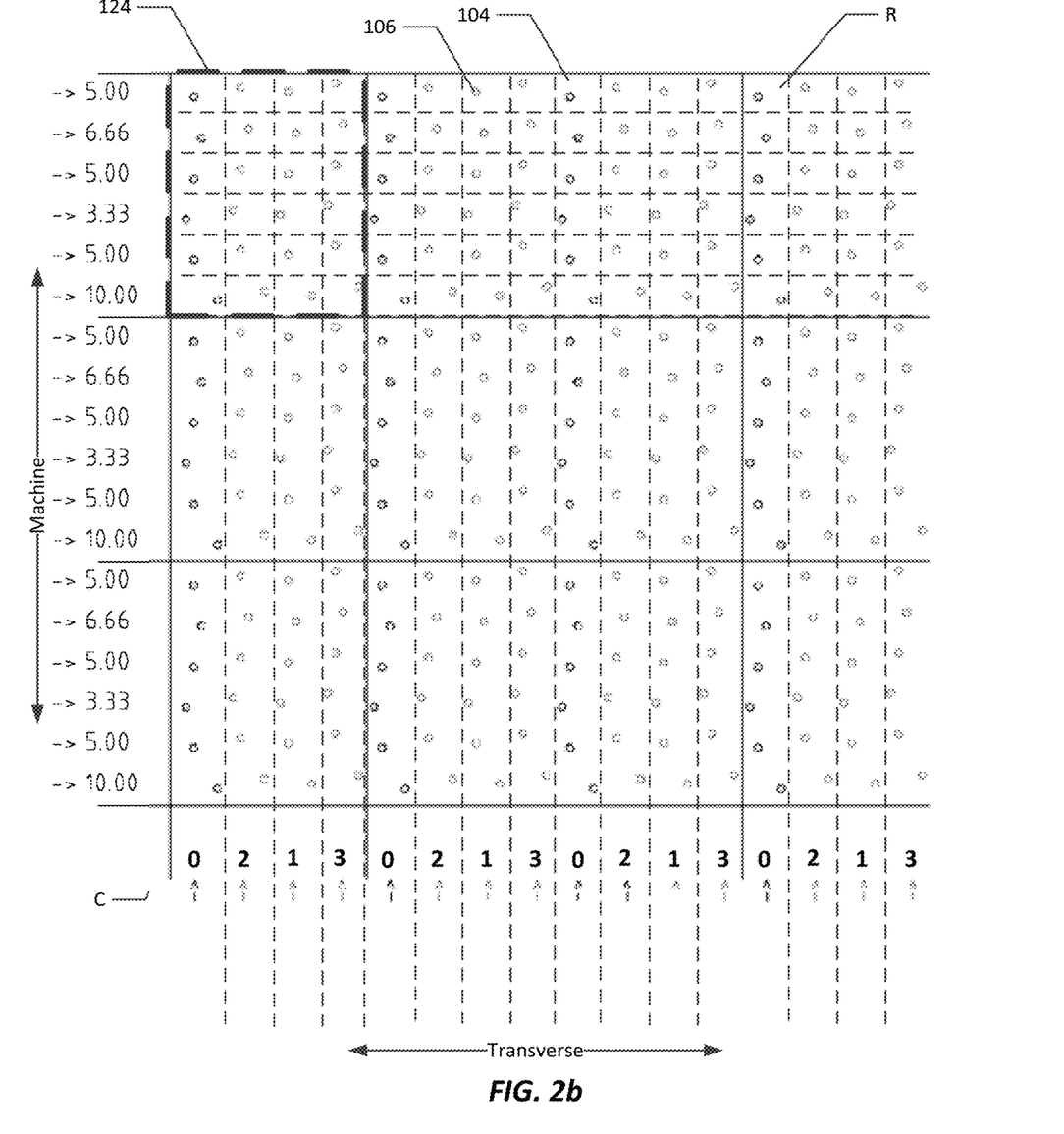

FIGS. 2a and 2b provide illustrations of a preferred nib pattern. The nibs form columns and rows, wherein the nibs then serve to define such a column and a row. The preferred randomized and repeating pattern 124 is preferably defined by four columns of nibs in the transverse direction and six rows of nibs in the machine direction, referred to here as a 4×6 array. However, the repeating randomized array may be in the range of 2 columns of nibs to 160 columns of nibs in the transverse direction by 2 rows of nibs to 180 rows of nibs in the machine direction, with a minimum size of 2 rows and 2 columns.

Accordingly, the repeating randomized array herein may be understood to preferably include 2 columns of nibs and 2 rows of nibs, containing a total of 4 nibs, where the 2 nibs defining the column are offset from one another proceeding downwardly in the column, and the two nibs defining the row are offset from one another proceeding across in the row of such array. In the preferred array configuration illustrated in FIG. 2b, the array 124 includes 4 columns of nibs, each column defined by 6 nibs (1 nib wide in the transverse direction by 6 nibs long in the machine direction). It also contains 6 rows of ribs, each row defined by 4 nibs (1 nib long in the machine direction by 4 nibs wide in the transverse direction), therein providing a total of 24 nibs. As can be seen in array 124, the nibs proceeding along the column are offset with respect to at least one other nib in the column and the nibs proceeding across the rows are similarly offset with respect to at least one other nib. More preferably, proceeding along the column or proceeding across the rows, each successive nib is offset with respect to a preceding nib.

In embodiments, such arrays accommodate mats ranging from 1 inch to 180 inches in height, including all values and ranges therein, and preferably 10 to 100 inches in height, and more preferably 60 inches in height, and of 1 inch to 160 inches in width, including all values and ranges therein, and preferably 10 to 100 inches in width, and more preferably 60 inches in width.

The size of the randomized pattern forming the array may be affected by, for example, the diameter and length of the pattern roll or mold. Within a given randomized pattern 124, the center points of the nibs, which amount to the center location point of each nib with respect to its perimeter, are arranged such that they are offset from at least one other nib (relative to its center point), such as an adjacent nib, in the row and in the column in which the nibs are positioned. Preferably, all of the nibs are offset from the other nibs (relative to their center points) in at least one of, if not both of, the row and column in which each nib is positioned. Also preferably, the center points of the nibs are offset in diagonal lines (D) 45 degrees from the transverse and machine direction. The rows are each in the range of 0.1 inch to 60 inches in height and the columns are each in the range of 0.1 inch to 60 inches in width.

To provide the randomized pattern 124 of FIGS. 2a and 2b the following exemplary pattern is used. Across the top row in the columns from left to right, the first nib may be understood as the reference point and has no offset, the second nib is offset 2 mm in the machine direction, the third nib is offset 1 mm in the machine direction, and the fourth nib is offset 3 mm in the machine direction. Along the rows, from the top of the figure down, the first nib is offset from a reference point at the edge of the row (represented by the black line on the left) by 5.1 mm, the second nib is offset from the edge of the row by 6.66 mm, the third nib is offset from the edge of the row by 5.1 mm, the fourth nib is offset from the edge of the row by 3.33 mm, the fifth nib is offset from the edge of the row by 5.1 mm and the sixth nib is offset by 10 mm from the edge of the row. In terms of the nibs, if the fourth nib is selected as having no offset, the $1^{st}$, $3^{rd}$ and $5^{th}$ nibs exhibit a 1.67 mm offset from the fourth nib, the $2^{nd}$ nib exhibits a 3.33 mm offset from the $4^{th}$ nib, and the $6^{th}$ nib exhibits an 8.67 mm offset from the $4^{th}$ nib. As may be appreciated any nib in the array may be selected as the reference nib.

The plurality of nibs creating the randomized pattern forms an array that is repeated along the transverse and machine directions. As illustrated in FIGS. 2a and 2b, the array is preferably repeated four times in the transverse direction and three times in the machine direction. However, the array may be repeated any number of times in the transverse direction and machine direction depending on the width and length of the product as well as the size of the array when the nibs are formed. In alternative embodiments, different randomized arrays may be used on a single floor mat, wherein the density of the nibs per square meter, the number of columns, or the number of rows of the individual arrays is varied.

As demonstrated in the examples provided herein, the randomized array patterns improve drag performance over arrays where the nibs are aligned in either the horizontal direction, the vertical direction, or both the horizontal and vertical direction for both tufted and non-woven floor systems. That is, the design meets or exceeds drag characteristics accepted by the industry as measured in terms of static coefficient of friction set forth in ASTM D1894-11, entitled *Static and Kinetic Coefficients of Friction of Plastic Film and Sheeting*, approved Sep. 1, 2011, published September 2011, in both vertical and horizontal directions for both tufted and non-woven systems. The nib design disclosed herein on its own will support the drag characteristics herein. The static coefficient of friction as measured by ASTM D1894-11 is in the range of 2.0 to 8.0, including all values and ranges therein, and particularly in the range of 4.0 to 8.0, relative to both tufted and non-woven surfaces. Such ranges provide sufficient drag performance.

Due to the height and configuration of the nibs, the nibs need not be removed for secondary processing steps such as edge finishing or marking. In embodiments, the edges of the floor mat are finished by sewing. The nibs do not become jammed in the pinch point between the pressure foot and feed dogs of industrial sewing machines. This allows free feeding of the unfinished edge of the cover layer and bottom layer through the machine.

Figure 3A:
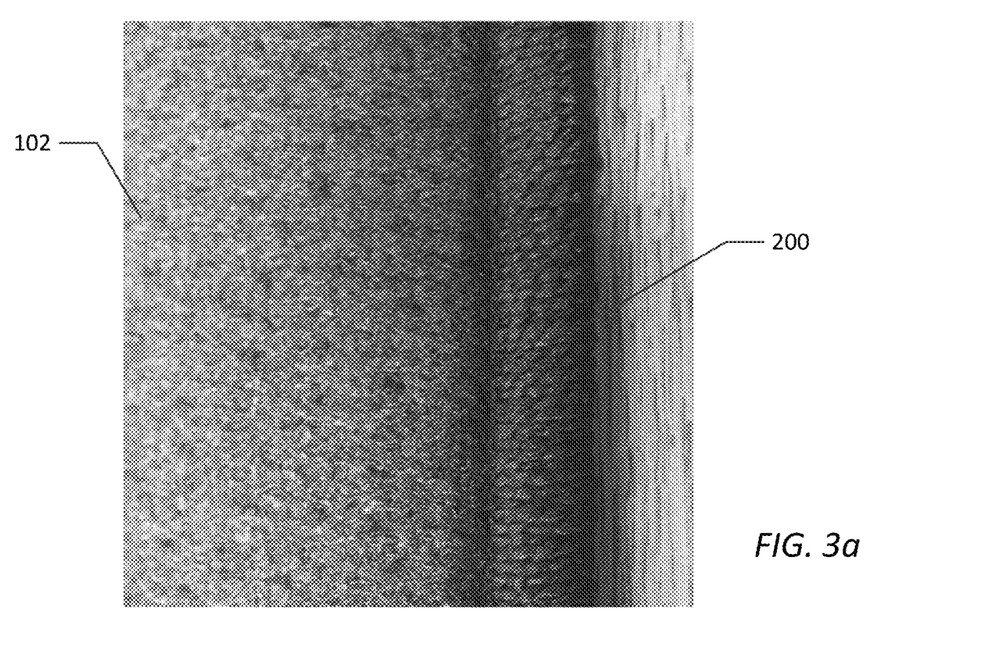
FIG. 3a is a top view of an embodiment of a floor mat including the nib pattern on the underside, the image captures the ability of an edge finish to be sewn on the mat without separation of the yarn stitches due to the presence of the nibs.
Figure 3B:
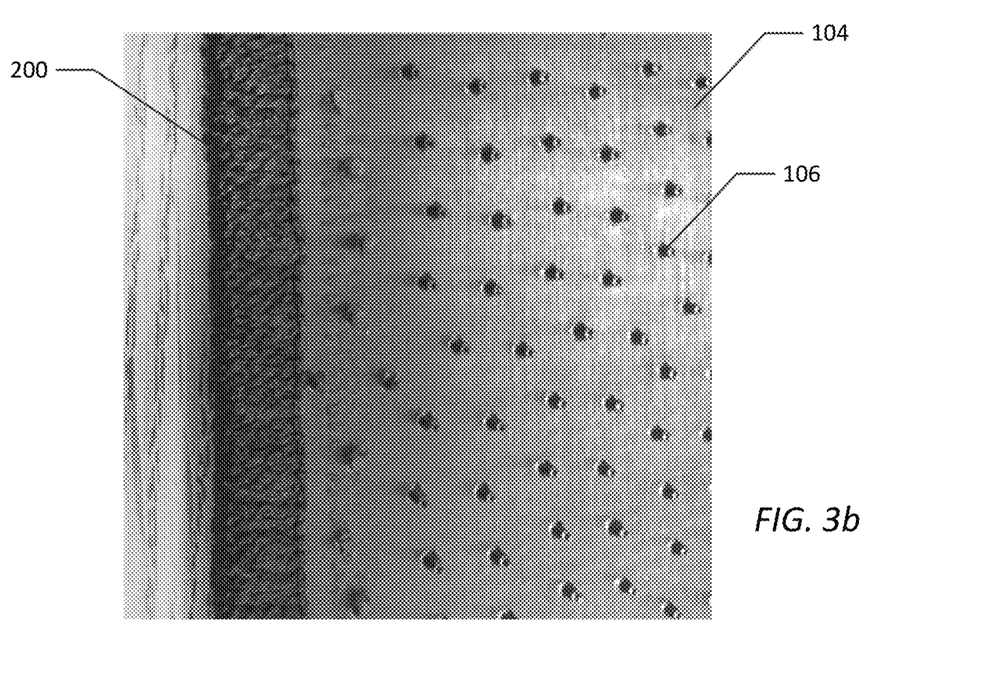
FIG. 3b illustrates the underside, "nib side", of the floor mat, again the image captures the ability of an edge finish to be sewn on the mat without separation of the yarn stitches due to the presence of the nibs.

A conventional roll pattern 200 for a given car shape, such as a single overcast stitch, a double overcast stitch, or a blanket stitch, is then preferably used to finish the edge of the floor mat. FIGS. 3a and 3b illustrate the cover layer 102 and the backing layer 104 of the floor mat, respectively. These FIGS. demonstrate that the nibs extending from the backing layer do not cause separation of the stitches on either side of the floor mat. Alternatively to stitching, a strip of binding may be sewn to finish the edges of the floor mat. Taller nib designs require the nibs to be cut off the back of the mat as the nibs become jammed in the pinched point of the sewing machine. Traditionally, in taller designs, nibs would have to be removed up to 1.25 inches from the perimeter of the mat.

Figure 4:
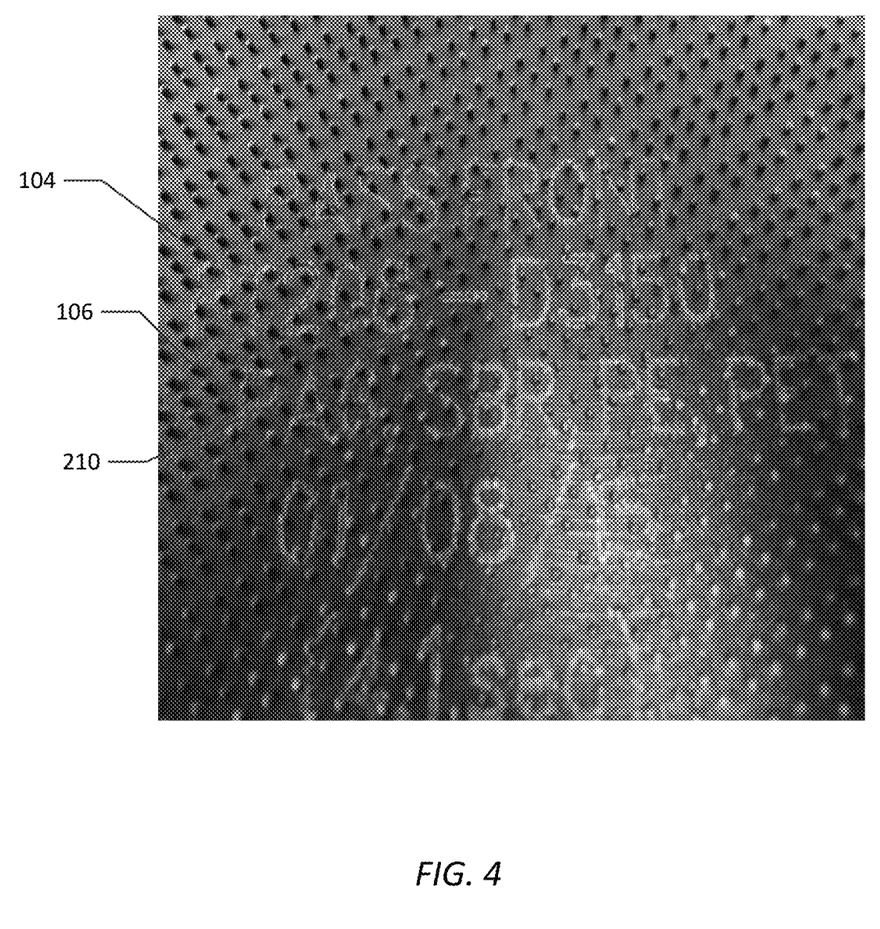
FIG. 4 is a photograph of the underside of a floor mat capturing the ability of the mat to be laser etched with product identification marks without having to remove the nibs in the area where etching is desired to maintain legibility of the etched image.

FIG. 4 depicts markings 210, representative of part identification information, applied to the backing layer 104 via laser etching. The laser etches over the nibs and the markings remain legible. It may be appreciated that other markings may alternatively be applied to the backing layer, such as paint or marker, with similar result. That is, the geometry of the nibs is short enough that the markings are not obscured by the nibs. Again, taller nib designs would require the nibs to be removed prior to marking.

of 30 ounces per square yard provides a 55% reduction in weight as compared to a backing layer that exhibits a basis weight of 68 ounces per square yard.

EXAMPLES

The floor mat backing layer was formed from a thermoplastic olefin compound that was compression molded onto the back of a 15 inch by 15 inch tufted carpet. The compression mold used the cavity pattern illustrated in FIG. 2a to form the desired nib pattern. The resulting basis weight of the thermoplastic olefin was 30 ounces per square yard. The design was tested using ASTM D1894-11 noted herein. Table 1 provides the testing results. As can be seen in the table above, all of the samples surpassed the testing requirements.

TABLE 1

ASTM D1894-11 Testing Results.

| Testing Surface | Pull Direction of Carpet, 0.5 kg weight | Sample Wt (kg) | Load Result (N) | Results: Static Coefficient of Friction Requirement >2.0 | Disposition |
| --- | --- | --- | --- | --- | --- |
| non-woven | Warp | 0.0243 | 28.5 | 5.54 | Pass |
|  | Warp | 0.0243 | 27.5 | 5.35 | Pass |
|  | Warp | 0.0243 | 36.9 | 7.17 | Pass |
|  | Fill | 0.0243 | 32.9 | 6.40 | Pass |
|  | Fill | 0.0243 | 24.2 | 4.71 | Pass |
|  | Fill | 0.0243 | 27.1 | 5.27 | Pass |
| Tufted | Warp | 0.0243 | 26.7 | 5.19 | Pass |
|  | Warp | 0.0243 | 25.2 | 4.90 | Pass |
|  | Warp | 0.0243 | 28.1 | 5.46 | Pass |
|  | Fill | 0.0243 | 31.7 | 6.16 | Pass |
|  | Fill | 0.0243 | 30.1 | 5.85 | Pass |
|  | Fill | 0.0243 | 28.9 | 5.62 | Pass |

Figure 5:
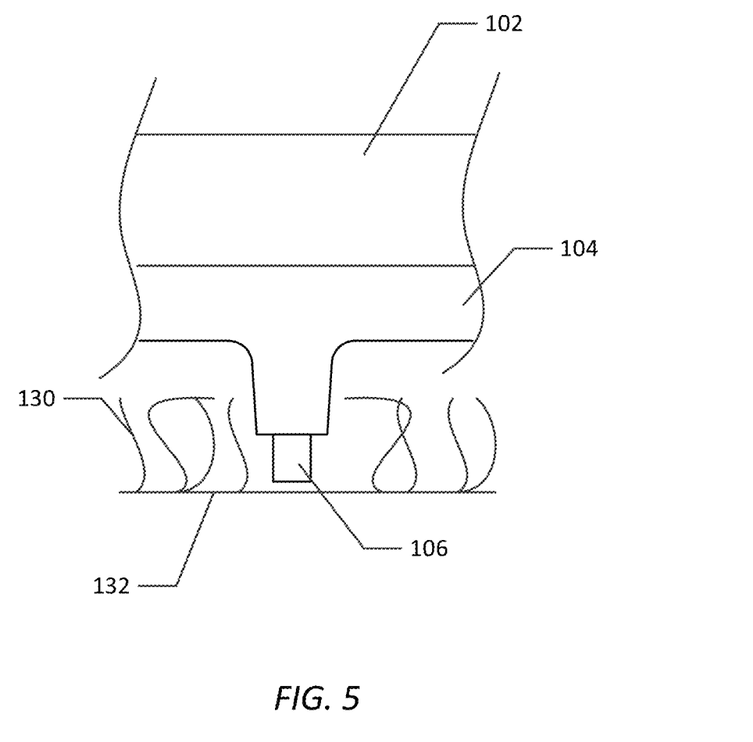
FIG. 5 is an embodiment of a floor mat engaged with a carpet system.

The floor mat is preferably deployed over carpeting systems in automotive cabins. However, the floor mat may be deployed over any carpeting system, such as those in vehicle storage compartments, in aircraft, or even over carpet in buildings. As illustrated in FIG. 5, the nibs 106 of the floor mat 100 extend into the fibers 130 of a woven or non-woven carpet 132. This aids in keeping the floor mat 100 in place, preventing displacement of the floor mat in the fore-, aft- and cross-car directions. As noted above, the underlying carpeting systems include woven or non-woven carpets. Non-woven carpeting systems may include an assembly of textile fibers held together by mechanical interlocking in a random mat or web, including needlepunching or hydroentangling methods. The structure may be bonded together either by a thermoplastic binder of or with a coating such as latex. The face of the non-woven may be flat or structured to form a pile. Fibers used to form the nonwoven may range from 0.5 to 4.5 inches and with a fiber denier ranging from 1 to 40. Woven carpeting systems may include tufted carpeting systems. The non-woven and woven carpet systems can be deployed on a molded floor system or a trunk or cargo liner.

Given the versatility of the nib pattern design, allowing the use of the floor mat over various carpeting systems, the design reduces manufacturing costs. For example, down time for nib pattern roll changes may be reduced as the same nib pattern may be deployed over a number of carpet systems. In addition, the basis weight of the backing layer is preferably lower than that of prior designs. For example, a backing layer as described herein exhibiting a basis weight In addition, the exemplary design provided a 55% weight reduction compared to prior backing materials and nib designs. In one example of a prior backing material, a mat was produced from styrene butadiene rubber and had a tall nib design of 4.75 mm having a nib density of 12,000 nibs per square meter. The material and nib combination of the prior design used 68 ounces per square yard of backing layer material to form the backing layer and fill the nib pattern.

The foregoing description of several methods and embodiments has been presented for purposes of illustration. It is not intended to be exhaustive or be limited to the precise steps and/or forms disclosed, and obviously many modifications and variations are possible in light of the above teaching.

What is claimed is:

1. A floor mat comprising:
    a backing layer having a thickness of 0.5 mm to 6.0 mm and a surface wherein said backing layer is formed from a thermoset or a thermoplastic elastomer having an ash content in the range of 20 to 40% by weight, a melt index in the range of 60 to 150 as measured at 190° C. and 21.6 kg, a tensile strength in the range of 3000 kPa to 5,000 kPa, an elongation in the range of 450% to 700% and a density in the range of 1.0 g/cm$^3$ to 1.33 g/cm$^3$; and
    a plurality of nibs formed from the backing layer and integrally connected to said backing layer extending from the surface, wherein
    each of the nibs is tiered, including a frusto-conical base extending from the surface of the backing layer, said frusto-conical base having an upper surface and a tip extending from said upper surface of the frusto-conical base defining a height for said tip wherein said tip includes a sidewall that meets the upper surface of said frusto-conical base wherein said tip has a diameter and said frusto-conical base has a diameter and the diameter of said tip is less than the diameter of said frusto-conical base, the nibs having a maximum diameter in the range of 0.5 to 3.0 mm and an overall height in the range of 1.5 mm to 5 mm wherein said height of said tip is 10-50 percent of said overall nib height and wherein said tip has a distal portion extending from said frusto-conical base of said nib that is flat, and each nib is located within a column and a row and is offset from at least one other nib present in the column and at least one other nib present in the row and wherein said floor mat indicates a static coefficient of friction of greater than 2.0, on a non-woven or tufted testing surface, in both vertical and horizontal directions of said testing surface, when tested according to ASTM D1894-11.

2. The floor mat of claim 1, wherein the plurality of nibs form an array of nibs contains a minimum of two columns of nibs and a minimum of two rows of nibs, thereby providing a total of at least 4 nibs, and said array is repeated on the backing layer.

3. The floor mat of claim 2, wherein the said array of nibs includes 4 columns of said nibs and 6 rows of said nibs, thereby providing a total of 24 nibs, and proceeding along the column or across the rows, each successive nib is offset with respect to a preceding nib.

4. The floor mat of claim 1, further comprising a cover layer positioned at a second surface of the backing layer opposing the surface of the backing layer including the nibs.

5. The floor mat of claim 4, further comprising an adhesive disposed between the cover layer and the backing layer.

6. The floor mat of claim 4, wherein the cover layer is tufted, woven, or non-woven.

7. The floor mat of claim 1, wherein the floor mat includes marking on the surface from which the nibs extend.

8. The floor mat of claim 1, wherein an edge of the floor mat includes a roll pattern, a binding, or both a roll pattern and a binding, and nibs are present underneath the roll pattern, the binding, or both the roll pattern and the binding.

9. The floor mat of claim 1, wherein the nibs are present at a density of 2,000 to 150,000 nibs per square meter.

10. The floor mat of claim 1 wherein said tip height is 25-35 percent of said overall nib height.

* * * * *